United States Patent
Ahonen

(10) Patent No.: US 6,728,532 B1
(45) Date of Patent: Apr. 27, 2004

(54) MEMORY REQUIREMENTS FOR MOBILE TERMINALS

(75) Inventor: Pasi Matti Kalevi Ahonen, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/890,124

(22) PCT Filed: Dec. 17, 1999

(86) PCT No.: PCT/FI99/01053
§ 371 (c)(1),
(2), (4) Date: Nov. 21, 2001

(87) PCT Pub. No.: WO00/45612
PCT Pub. Date: Aug. 3, 2000

(30) Foreign Application Priority Data

Jan. 29, 1999 (FI) .................................................. 990168

(51) Int. Cl.[7] ............................................... H04M 3/00
(52) U.S. Cl. ........................ 455/419; 455/418; 455/420; 455/422.1; 455/517; 455/550.1; 709/206; 709/219
(58) Field of Search ............................. 455/422.1, 517, 455/550.1, 418, 419, 420; 709/206, 219

(56) References Cited

U.S. PATENT DOCUMENTS

| 5,175,834 | A |   | 12/1992 | Sawai |
| 5,771,354 | A |   | 6/1998 | Crawford |
| 5,869,825 | A | * | 2/1999 | Ziarno ........................ 235/380 |
| 6,138,036 | A | * | 10/2000 | O'Cinneide .................. 455/557 |
| 6,314,094 | B1 | * | 11/2001 | Boys .......................... 370/352 |
| 6,343,311 | B1 | * | 1/2002 | Nishida et al. ............. 709/203 |
| 6,556,823 | B2 | * | 4/2003 | Clapton et al. ............. 455/433 |

FOREIGN PATENT DOCUMENTS

| EP | 0637004A | A | 2/1995 |
| GB | 2320855 | A | 7/1998 |
| WO | WO96/17460 | A | 6/1996 |
| WO | WO98/59503 | A | 12/1998 |

* cited by examiner

Primary Examiner—Quochien B. Vuong
Assistant Examiner—Duy K Le

(57) ABSTRACT

A method of storing electronic data in a system having a mobile terminal (8) and a remote system (1), the mobile terminal (8) and the remote system (1) interacting with each other to exchange electronic data. In order to prevent data loss at the mobile terminal (8), data storage capacity and storage requirements are monitored at the mobile terminal (8). If a risk exists that the data storage capacity of the mobile terminal (8) is likely to be exceeded, electronic data from the mobile terminal (8) is uploaded to the remote system (1), and stored there. The previously uploaded data is subsequently downloaded from the remote system (1) to the mobile terminal (8) in the event that that data is required by the mobile terminal (8) or a determination is made that the risk of exceeding the data storage capacity of the mobile terminal (8) no longer exists.

10 Claims, 2 Drawing Sheets

MEMORY REQUIREMENTS FOR MOBILE TERMINALS

FIELD OF THE INVENTION

The present invention relates to memory requirements for mobile hosts and in particular, though not necessarily, to the memory requirements of mobile telephones and smart phones.

BACKGROUND OF THE INVENTION

The recent growth in the use of mobile telephones has resulted in a large number of proposals being made as to how the role of such telephones can be extended beyond that of merely making and receiving telephone calls. Indeed, a number of these proposals have already been implemented—the ability to send and receive text messages and faxes and to browse the WWW are but two examples.

Definite steps are also being made in the use of mobile electronic terminals (with a particular emphasis on mobile telephones) to allow users to interactively control local systems such as parking meters and vending machines. For example, a number of major companies are currently involved in the development of a standardised interface for this application, under a project termed "Bluetooth".

What most of these proposals have in common is the requirement for the transfer of relatively large amounts of electronic data between the mobile terminals and the interacting systems (be that a local system or a telephone network). Much of this data must be stored at the mobile terminal even if only as a temporary measure. In addition, advanced applications running at a mobile terminal will themselves generate a large amount of data which must be stored at the mobile terminal. This need to store data at a mobile terminal will inevitably place considerable demands on the memory available at the mobile terminal which is always going to be limited due to both size and cost constraints.

In the event that data requiring storage at a mobile terminal exceeds the available memory space, one or more applications running at the terminal are likely to crash, or at least the running of the application(s) will be suspended. In a worst case scenario, valuable data may be lost. This is particularly serious where an electronic commerce application is running at the mobile terminal and where financial transaction data may be lost.

SUMMARY OF THE PRESENT INVENTION

It is an object of the present invention to overcome or at least mitigate the disadvantage noted above. In particular, it is an object of the present invention to prevent or reduce the risk of memory overload at a mobile terminal when the terminal is interacting electronically with other equipment or systems.

These and other objects are achieved, at least in part, by enabling a mobile terminal to upload electronic data to the equipment or system with which it is interacting in the event that a risk of memory overload is recognised. The uploaded data can then be retrieved by the mobile terminal when this risk is reduced or eliminated.

According to a first aspect of the present invention there is provided a method of storing electronic data in a system having a mobile terminal and a remote system, the mobile terminal and the remote system interacting with each other to exchange electronic data, the method comprising:

transmitting from the remote system to the mobile terminal a notification including an identification of the amount of data to be downloaded;

determining at the mobile terminal when a risk of exceeding a data storage capacity of the mobile terminal exists;

uploading electronic data from the mobile terminal to the remote system in the event that such a determination is made, and storing the uploaded data at the remote system; and subsequently downloading the previously uploaded data from the remote system to the mobile terminal in the event that the uploaded data is required by the mobile terminal or a determination is made that the risk of exceeding the data storage capacity of the mobile terminal no longer exists.

Embodiments of the present invention assist in preventing the overloading of memory at a mobile station and therefore reduce the risk of applications crashing and/or data being lost at the mobile terminal.

Preferably, said exchange of data between the mobile terminal and remote system is carried out at least in part via a wireless interface. Most preferably, the wireless interface is a radio interface although other interfaces, such as infrared or ultrasonic, may be used.

In certain embodiments of the invention, said remote system is a local system, for example a parking meter or a vending or sales machine, and the local system interacts with the mobile terminal using a local radio air interface protocol RI1. In other embodiments however, the remote system may be a radio network or a system coupled to the radio network.

Preferably, the mobile terminal is or comprises a mobile telephone arranged to communicate with a mobile telephone network. Said exchange of electronic data, including said uploading and downloading of data, may occur via a link between the terminal and the network or may occur via a second distinct wireless interface.

The electronic data uploaded from the mobile terminal to the remote system may include application software (i.e. executable code), state information, and user data. Preferably, the uploaded data is converted into a serial format for transmission to the remote system.

According to a second aspect of the present invention there is provided apparatus for storing electronic data in a system having a mobile terminal and a remote system, the mobile terminal and the remote system interacting with each other to exchange electronic data, the apparatus comprising:

transmitting means at the remote system for transmitting to the mobile terminal a notification including an identification of the amount of data to be downloaded processing means at the mobile terminal for determining when a risk of exceeding a data storage capacity of the mobile terminal exists;

first data transfer means for uploading electronic data from the mobile terminal to the remote system in the event that such a determination is made;

memory means at the remote system for storing the uploaded data at the remote system; and second data transfer means for subsequently downloading the previously uploaded data from the remote system to the mobile terminal in the event that the uploaded data is required by the mobile terminal or a determination is made that the risk of exceeding the data storage capacity of the mobile terminal no longer exists.

According to a third aspect of the present invention there is provided a mobile terminal arranged in use to interact with a remote system by way of the exchange of electronic data, the terminal comprising:

receiving means for receiving a notification including an identification of the amount of data to be downloaded processing means for determining when a risk of exceeding a data storage capacity of the mobile terminal exists;

data transmission means for uploading electronic data from the mobile terminal to the remote system in the event that such a determination is made; and data reception means for subsequently downloading the previously uploaded data from the remote system to the mobile terminal in the event that the uploaded data is required by the mobile terminal or a determination is made that the risk of exceeding the data storage capacity of the mobile terminal no longer exist.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
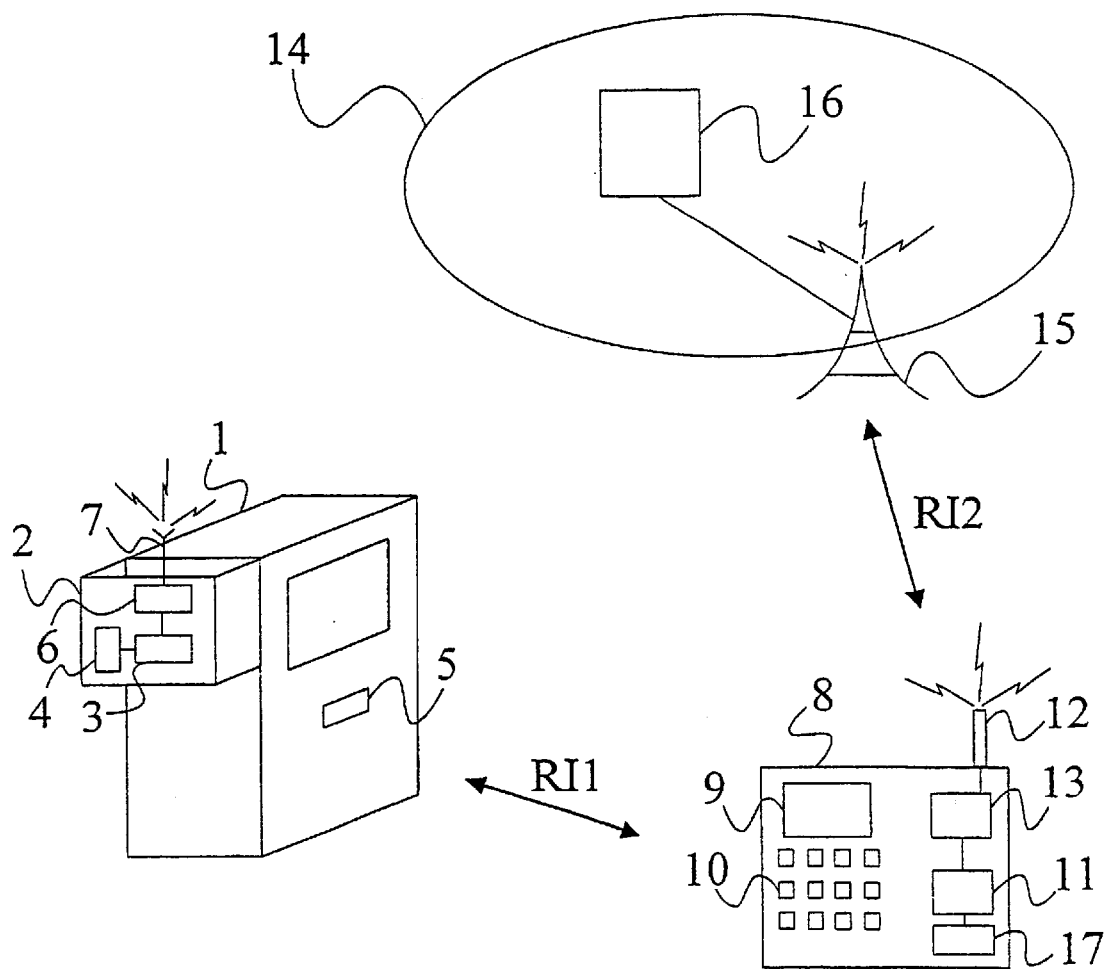
FIG. 1 shows schematically a system in which a mobile telephone is used to remotely control a local system.

There is illustrated in FIG. 1 a vending machine 1 forming part of a system in which the present invention may be employed. Articles which may be purchased from the vending machine include the likes of soft drinks, chocolate bars, etc. The vending machine has a control unit 2 which comprises a central processing unit 3 as well as a memory device 4 which stores inter alia control instructions for the central processing unit 3 as well as other data. The control unit 2 is electrically connected to the mechanical selection and outlet mechanism of the vending machine 1 such that the control unit can cause specific items to be dispensed to a consumer via an outlet tray 5 of the vending machine.

The control unit 2 also comprises a radio frequency transceiver 6 which is coupled on the one side to the central processing unit 3 via appropriate interface circuitry (not shown in the Figure) and on the other side to a transmitting and receiving antenna 7. The transceiver 6, antenna 7, and central processing unit 3 are arranged to communicate with mobile terminals such as mobile telephones via a standardised local radio air interface protocol RI1. The range over which such communications may be carried out is relatively small, e.g., of the order of 10 meters.

FIG. 1 illustrates a mobile telephone 8 which may be thought of as a "smart phone". The telephone 8 comprises a display 9 and a keyboard 10, as well as a central processing unit (or digital signal processor) 11. An antenna 12 and transceiver 13 of the telephone 8 enable the telephone to communicate in the normal way (over radio interface RI2) with a cellular telephone network 14 via a base station 15 of the network, e.g. using the GSM protocol. The central processing unit 11 is additionally able to communicate with the control unit 2 of the vending machine 1 using the previously mentioned standardised local air interface RI1. The same antenna 12 and transceiver 13 may be used for such local communications although another antenna and transceiver may be required. As the telephone 8 is able to communicate using two different protocols, it may be considered a "dual-mode" telephone.

In use, the control unit 2 is arranged to broadcast at regular intervals a Terminal Alert message over its 10 meters broadcast range. Mobile terminals such as the telephone 8 are programmed to listen for such Terminal Alert messages and, upon receipt, to alert the telephone user that the telephone is within the coverage range of a local system to which the user has access. The Terminal Alert message will typically contain additional information describing the service which the broadcasting system offers. This may be displayed as text or an icon on the display 9 of the telephone 8. A message is also displayed, asking the user to accept or reject the transmitted offer.

In the event that the user accepts the offer by pressing an appropriate key on the telephone's keyboard 10, an Accept message is returned from the telephone 8 to the vending machine's control unit 2 over the local connection RI1. Upon receipt of the Accept message, the central processing unit 3 of the control unit 2 transmits an Authentication message to the mobile telephone 8 over the local radio interface RI1. The message is recognised by the central processing unit 11 of the telephone 8 as being a message intended for the mobile network 14. The telephone 8 initiates a telephone call to the network 14 and transmits the Authentication message over interface RI2. The message is then conveyed to a charging and authentication database 16 within the network 14. This process of relaying the message from the vending machine to the telephone network may involve the vending machine effectively taking control of the mobile telephone.

The database 16 contains a record of mobile telephones which are entitled to use the services of the vending machine 1. Assuming that the mobile telephone is so entitled, a Confirm Authentication message is returned from the network 14 to the mobile telephone 8. The message is recognised by the central processing unit 11 as destined for the vending machine 1 and is relayed to the vending machine over the interface RI1. It will be appreciated that the authentication process (and charging process to be described below) involves a secure protocol such that the user of the mobile telephone 8 is not able to interfere in the process.

When the identity of the telephone 8 has been authenticated by the vending machine 1, the vending machine transmits to the telephone a notification that preparations are being made to download a set of interface software instructions to the telephone 8 over the local wireless connection RI1. This notification includes an identification of the amount of data to be downloaded, e.g. 50 KB. Upon receipt of the notification, the telephone 8 interrogates its memory 17 to determine whether enough spare capacity exists in the memory 17 to store the instructions about to be downloaded. If the answer is yes, then a "proceed" message is returned by the telephone 8 to the vending machine 1 and the downloading process proceeds.

If however the answer is no, then space must be created in the telephone's memory 17 for the instructions. This is done by identifying data currently held in the memory 17 which is not required for the current operation of the telephone 8. For example, this data may relate to the standard telephone interface. The identified data is serialised by the telephone's central processing unit 11 and is transmitted to the vending machine 1 over the interface RI1 together with a header part which identifies to the vending machine's control unit 2 that the transmitted data is to be stored temporarily in the control unit's memory 4. The data may be transmitted to the vending machine 1 in an encrypted form. Assuming that the data is correctly received and stored by the control unit 2, the memory space occupied by the transmitted data is erased, and the process of downloading the interface software instructions to the telephone 8 proceeds.

Instructions are received by the transceiver 13 of the telephone, and are stored in the memory 17. On the basis of the instructions, the central processing unit 11 of the telephone configures the user interface of the telephone 8 according to the specific requirements of the vending machine 1. For example, the downloaded instructions may result in a list of the goods available from the vending machine being available for display on the telephone's display 9. The user may then select an article to be purchased by using a scroll key, and by pressing an accept (or OK) key, whereupon the cost of the selected article is retrieved from the downloaded instruction set and displayed. The user may then conclude the transaction by again pressing the accept key. This final action results in a Purchase message being transmitted from the telephone 8 to the control unit 2 of the vending machine 1.

Upon receipt of the Purchase message, the central processing unit 3 of the control unit 2 instructs the vending machine to select and dispense the article identified in the Purchase message. The central processing unit 3 then transmits a Charging message to the mobile telephone 8 over interface RI1. As with the Authentication message, the Charging message is relayed by the telephone 8 to the mobile network 14 over interface RI2. The message is relayed to the charging and authentication database 26 which debits the transaction cost from the telephone user's account and credits it to an account held by the operator of the vending machine 1. It will be appreciated that other charging schemes may be used. For example, the cellular network operator may act as an electronic bank for the subscriber, holding a deposit of electronic money. Electronic money is transferred to the vending machine operator (or his bank) upon completion of the transaction.

At the end of this process, a "Transaction Complete" message is sent from the vending machine 1 to the telephone 8. Upon receipt of this message, the central processing unit 11 of the telephone 8 erases the downloaded user interface instructions from its memory 17. In the event that data was previously uploaded from the telephone 8 to the vending machine prior to transfer of the user interface instructions to the telephone 8, the vending machine now commences the reverse procedure of downloading the serialised data to the telephone. At the telephone 8, the received data is re-stored (after decryption if required) in its original location in the telephone's memory 17, or in a suitable alternative location within that memory 17.

Figure 2:
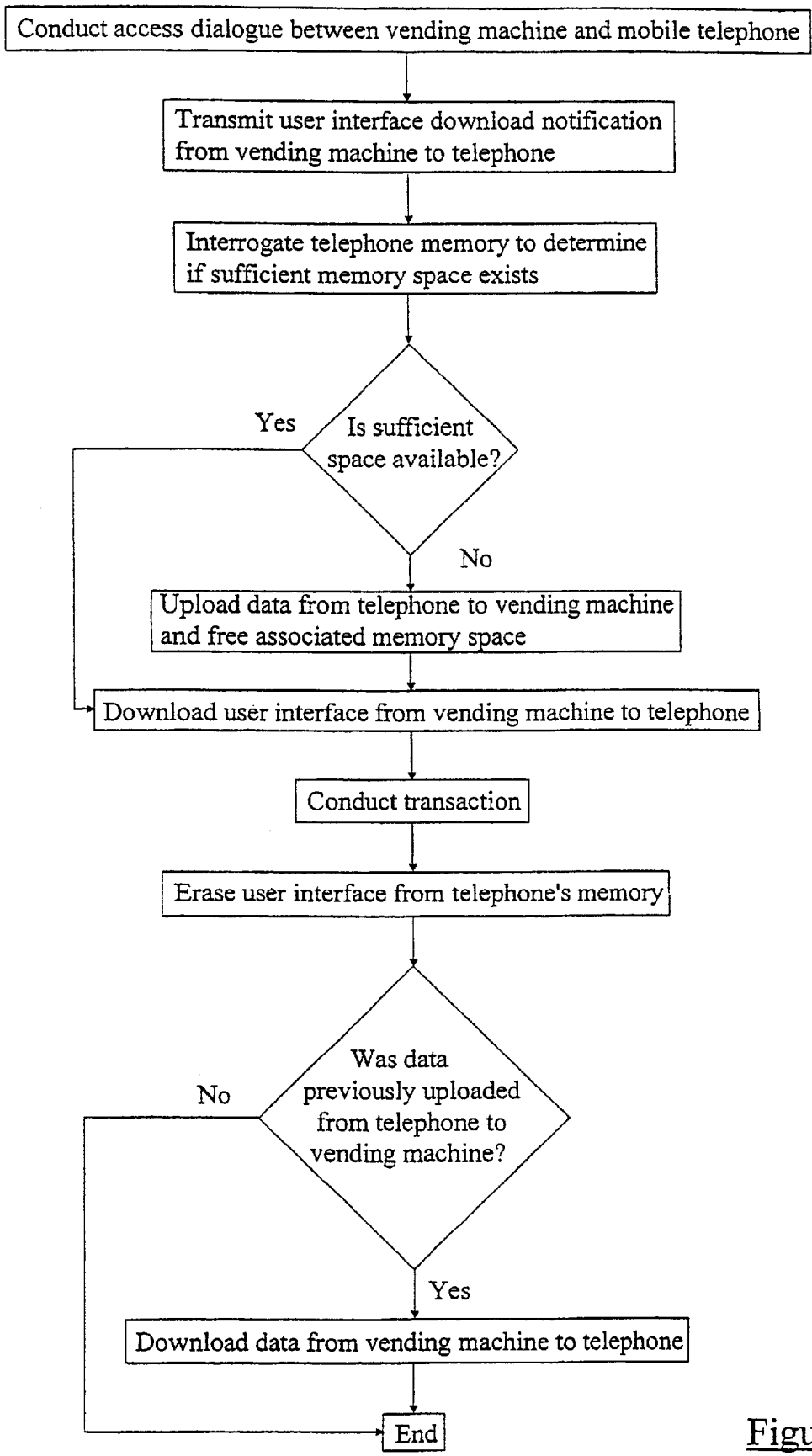
FIG. 2 is a flow diagram illustrating the method of operation of the system of FIG. 1.

The method described above is further illustrated in the flow diagram of FIG. 2.

The above description has referred only generally to the type of data which may be uploaded from a mobile terminal to the vending machine in order to create temporary storage space in the terminal's memory. The person of skill in the art will readily appreciate that this data may take one of many forms. For example, the data may be software objects together with current state information. The data may be serialized for transmission between the mobile terminal and the vending machine.

It will be appreciated by the person of skill in the art that other modifications may be made to the above described embodiment without departing from the scope of the present invention. For example, during a given transaction between the mobile terminal 8 and the vending machine 1, more than one set of data may be uploaded to, and subsequently downloaded from, the vending machine 1. This may be necessary, for example, where it is not possible to predict exactly the storage requirements of the user interface and/or subsequently generated data such that the data storage requirements change during the transaction.

What is claimed is:

1. A method of storing electronic data in a system having a mobile terminal and a remote system, the mobile terminal and the remote system interacting with each other to exchange electronic data, the method comprising:

transmitting from the remote system to the mobile terminal a notification including an identification of the amount of data to be downloaded;

determining at the mobile terminal when a risk of exceeding a data storage capacity of the mobile terminal exists;

uploading electronic data from the mobile terminal to the remote system in the event that such a determination is made, and storing the uploaded data at the remote system; and subsequently downloading the previously uploaded data from the remote system to the mobile terminal in the event that the unloaded data is required by the mobile terminal or a determination is made that the risk of exceeding the data storage capacity of the mobile terminal no longer exists.

2. A method according to claim 1 and comprising carrying out said exchange of data between the mobile terminal and the remote system at least in part via a wireless interface.

3. A method according to claim 2, wherein said wireless interface is a radio interface.

4. A method according to claim 1, wherein said remote system is a local system which interacts with the mobile terminal using a local radio air interface protocol RI1.

5. A method according to claim 1, wherein the remote system is a radio network or a system coupled to the radio network.

6. A method according to claim 1, wherein the mobile terminal is or comprises a mobile telephone arranged to communicate with a mobile telephone network.

7. A method according to claim 1, wherein the electronic data uploaded from the mobile terminal to the remote system includes application software, state information, or user data.

8. A method according to claim 1, comprising converting the uploaded data into a serial format for transmission to the remote system.

9. Apparatus for storing electronic data in a system having a mobile terminal and a remote system, the mobile terminal and the remote system interacting with each other to exchange electronic data, the apparatus comprising:

transmitting means at the remote system for transmitting to the mobile terminal a notification including an identification of the amount of data to be downloaded;

processing means at the mobile terminal for determining when a risk of exceeding a data storage capacity of the mobile terminal exists:

first data transfer means for uploading electronic data from the mobile terminal to the remote system in the event that such a determination is made;

memory means at the remote system for storing the uploaded data at the remote system; and second data transfer means for subsequently downloading the previously uploaded data from the remote system to the mobile terminal in the event that the unloaded data is required by the mobile terminal or a determination is made that the risk of exceeding the data storage capacity of the mobile terminal no longer exists.

10. A mobile terminal arranged in use to interact with a remote system by way of the exchange of electronic data, the terminal comprising:

receiving means for receiving a notification including an identification of the amount of data to be downloaded;

processing means for determining when a risk of exceeding a data storage capacity of the mobile terminal exists;

data transmission means for uploading electronic data from the mobile terminal to the remote system in the event that such a determination is made; and data reception means for subsequently downloading the previously uploaded data from the remote system to the mobile terminal in the event that the uploaded data is required by the mobile terminal or a determination is made that the risk of exceeding the data storage capacity of the mobile terminal no longer exists.

* * * * *